United States Patent
Robbins et al.

(10) Patent No.: US 11,247,944 B2
(45) Date of Patent: Feb. 15, 2022

(54) POTASSIUM CITRATE MIXTURE FORMED FROM A DRY FERTILIZER AND METHODS THEREOF

(71) Applicants: Jeffrey Hanson Robbins, San Diego, CA (US); Ariel Nehemiah Tenenbaum, San Diego, CA (US)

(72) Inventors: Jeffrey Hanson Robbins, San Diego, CA (US); Ariel Nehemiah Tenenbaum, San Diego, CA (US)

( * ) Notice: Subject to any disclaimer, the term of this patent is extended or adjusted under 35 U.S.C. 154(b) by 117 days.

(21) Appl. No.: 16/382,537

(22) Filed: Apr. 12, 2019

(65) Prior Publication Data

US 2020/0325081 A1 Oct. 15, 2020

(51) Int. Cl.
| | | |
|---|---|---|
| *C05D 1/00* | (2006.01) | |
| *C05F 11/00* | (2006.01) | |
| *B65D 77/04* | (2006.01) | |
| *C05G 5/23* | (2020.01) | |
| *C05G 5/20* | (2020.01) | |
| *A01C 23/00* | (2006.01) | |

(52) U.S. Cl.
CPC ............ *C05F 11/00* (2013.01); *B65D 77/04* (2013.01); *C05D 1/00* (2013.01); *C05G 5/20* (2020.02); *C05G 5/23* (2020.02); *A01C 23/00* (2013.01)

(58) Field of Classification Search
CPC .. C05F 11/00; C05G 5/20; C05G 5/23; C05D 1/00; B65D 77/04; A01C 23/00
See application file for complete search history.

(56) References Cited

U.S. PATENT DOCUMENTS

| 3,197,302 A | 7/1965 | Macbride |
|---|---|---|
| 5,034,045 A | 7/1991 | Alexander |
| 5,503,651 A | 4/1996 | Kloepper |
| 6,565,881 B1 * | 5/2003 | Nurnberg .............. A61K 8/738 424/466 |
| 9,314,031 B2 | 4/2016 | Haas |
| 10,172,793 B2 | 1/2019 | Henriksen |
| 2003/0170301 A1 | 9/2003 | Wehling |
| 2004/0035162 A1 | 2/2004 | Williams |
| 2004/0200248 A1 | 10/2004 | Kirkegaard |
| 2005/0022570 A1 | 2/2005 | Duarte-MacDonald |
| 2016/0304407 A1 | 10/2016 | Bame |

(Continued)

FOREIGN PATENT DOCUMENTS

| CN | 102648715 A | 8/2012 |
|---|---|---|
| CN | 102823589 A | 6/2014 |

(Continued)

OTHER PUBLICATIONS

Alka-Seltzer Gold—alka-seltzergold tablet, effervescent. <https://dailymed.nlm.nih.gov/dailymed/fda/fdaDrugXsl.cfm?setid=0824bedb-413b-2fa0-e054-00144ff88e88&type=display> Effective Time: May 5, 2017.*

(Continued)

*Primary Examiner* — Jennifer A Smith

(57) ABSTRACT

There is disclosed a dry fertilizer comprising citric acid and potassium carbonate or potassium bicarbonate. The dry fertilizer may be one of a tablet, powder, meal and pellet. The dry fertilizer may include one of plant nutrients, soil nutrients, carbonates, bicarbonates, acids, oils, microorganisms, biostimulants, enzymes, hormones, fertilizers, lubricants, and binding agents. The dry fertilizer may be packaged.

11 Claims, 1 Drawing Sheet

(56) References Cited

U.S. PATENT DOCUMENTS

2016/0347675 A1 12/2016 Roach
2018/0244589 A1 8/2018 Roach

FOREIGN PATENT DOCUMENTS

| CN | 104365592 A | | 2/2015 |
|---|---|---|---|
| CN | 105130677 A | * | 12/2015 |
| CN | 106588358 A | | 4/2017 |
| CN | 106631284 A | | 5/2017 |
| CN | 106673840 A | | 5/2017 |
| CN | 107244966 A | | 10/2017 |
| DE | 2513696 A1 | * | 10/1975 |
| IN | 201721021523 A | | 6/2017 |
| KR | 20180074390 A | | 7/2018 |
| WO | WO-2017060861 | * | 4/2017 |

OTHER PUBLICATIONS

Kelli's Gifts. "Wholesale Single Dose Over the Counter Medicine Display" <https://www.kellisgifts.com/single-dose-over-the-counter-medicine-display/> Nov. 15, 2017.*
Elliott, John. "10 Great Gardening Tips & Ideas" English Country Garden <http://www.english-country-garden.com/articles/gardening-tips-and-ideas.htm> Apr. 26, 2017.*
Chen, Yueh-Huey, and Jing-Fun Yaung. "Alka-Seltzer Fizzing-Determination of Percent by Mass of NaHCO3 in Alka-Seltzer Tablets. An Undergraduate General Chemistry Experiment." Journal of chemical education 79.7 (2002): 848.*
Ruth. Corcoran Printing "5 Tips for better retail hanging display packaging design" Mar. 23, 2018 <https://corcoranprinting.com/tips-for-printed-retail-display-packaging/> (Year: 2018).*
Amazon. Calgon Take Me Away! Lavender & Honey Moisturizing Bath Soak Fizzies Bombs 8—2.1 Oz Balls Date First Available : Apr. 20, 2017 <https://www.amazon.com/Calgon-Lavender-Honey-Moisturizing-Fizzies/dp/B071D7H73R/ref=sr_1_56> (Year: 2017).*
Effer-K 10mEq and 20 mEq Tablets (Effervescent Potassium Bicarbonate/ Citric Acid Tablets for OralSolution, USP) Revised: Dec. 2019 <https://dailymed.nlm.nih.gov/dailymed/fda/fdaDrugXsl.cfm?setid=8869554b-ff0b-4f0e-8a09-61e7be3b496e&type=display> (Year: 2019).*
Chun, Wesley. "Amino Acids as Plant Biostimulants" Grower's Secret. <https://www.growerssecret.com/amino-acids-as-biostimulants> Obtained: Jun. 22, 2021 (Year: 2021).*
Zhang H. Kim MS, Krishnamachari V, Payton P, Sun Y, GrimsonM, Farag MA, Ryu CM, Allen R, Melo IS, Pare PW: Rhizobacterial volatile emissions regulate auxin homeostasis and cell expansion in *Arabidopsis*, Planta 2007, 226 (pp. 839-851).
Lugtenberg BJJ, Kamilova F: Plant-growth-promoting rhizobacteria. Ann Rev Microbiol 2009, 63 (pp. 541-556).
Tsavkelova EA, Klimova SY, Cherdyntseva TA, Netrusov AI: Microbial producers of plant growth stimulators and their practical use: a review. Appl Biochem Microbiol 2006, 42 (pp. 117-126).
Spaepen S, Vanderleyden J, Remans R: Indole-3-acetic acid in microbial and microorganism-plant signaling. FEMS Microbiol Rev 2007, 31 (pp. 425-448).
Arkhipova TN, Prinsen E, Veselov SU, Martinenko EV, Melentiev AI, Kudoyarova GR: Cytokinin producing bacteria enhance plant growth in drying soil. Plant Soil 2007, 292 (pp. 305-315).
Oritz-Castro R, Valencia-Cantero E, Lo'pez-Bucio J: Plant growth promotion by Bacillus megaterium involves cytokinin signaling. Plant Signal Behav 2008, 3 (pp. 263-265).
Keith Jones. "First U.S. Definition of Plant Biostimulants" https://www.buisinesswire.com/news/home/20180417006140/en/U.S.-Definition-Plant-Biostimulants (pp. 1-2). Archive date Apr. 14, 2018.
Solutions 4EARTH, LLC. Komodo Pro. http://solutions4earth.com/products/komodo-pro/ (p. 1). Obtained Jan. 25, 2019.
CustomBio, Biota Max™. http://www.biotamax.com/BiotaMax.html (p. 1). Obtained Jan. 25, 2019.
Nair, Sneha S., and G, P. Brahmaprakash. "Effect of effervescent biofertilizer consortial tablets on growth of tomato (*Lycopersiconesculentum* Mitt.)." Int. J. Curr. Microbiol. App. Sci 6.9 (2017): 615-623. (Year: 2017).
Kurdish, I. K., and L. V. Tilova. "Granular preparations of Azotobacter containing clay minerals." Applied Biochemistry and Miorobiology 36.4 (2000): 418-420. (Year: 2000).

* cited by examiner

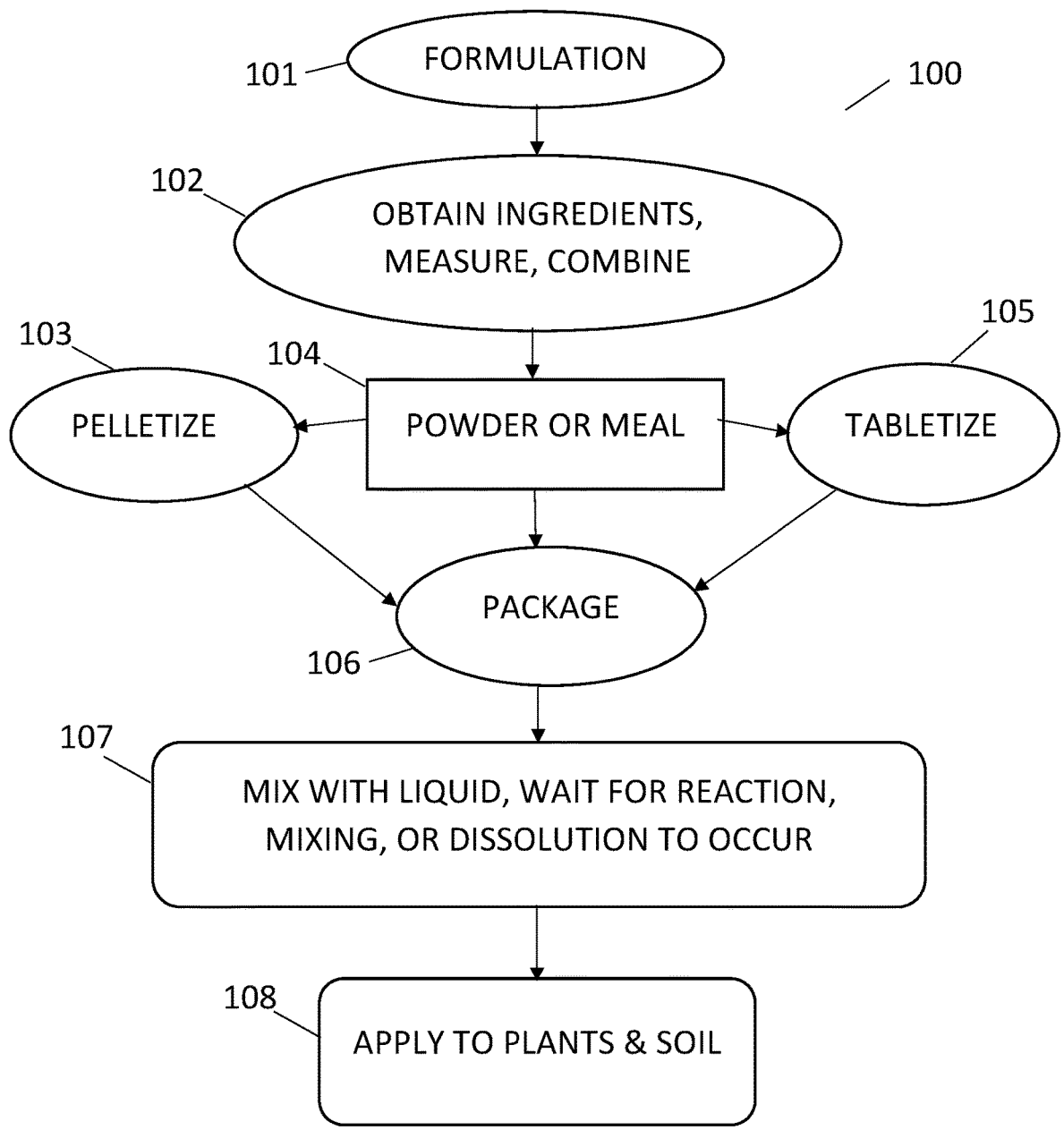

POTASSIUM CITRATE MIXTURE FORMED FROM A DRY FERTILIZER AND METHODS THEREOF

BACKGROUND OF THE INVENTION

1. Field of the Invention

The present invention relates to fertilizers, and more particularly, a dry fertilizer that forms a potassium citrate mixture when exposed to a liquid, such as water or a water-based liquid, and methods of making the same.

2. Background

Healthy plants require various nutrients from the soil in which they are planted or grow. Yet, soils by themselves typically do not have enough nutrients in order to maintain a consistent healthy growth. Thus, fertilizers are used in various forms and are commonly applied to the soil or plant in order to cover nutritional deficiency.

The three essential macro nutrients used by plants are nitrogen (N), phosphorus (P), and potassium (K). They are commonly referred to as N—P—K. Generally, fertilizers may include a combination of these nutrients in the form of chemical compounds. Fertilizers with chemical compounds containing potassium are used to improve overall plant functions including strong stem growth, movement of water throughout the plant, flowering and fruiting. In the soil, the presence of potassium fertilizer can increase water retention and aeration. Without potassium, plants exhibit insufficient root development, slow and stunted growth, and poor flower, fruit, and seed development.

Traditional potassium fertilizers are derived from natural or synthetic salts collectively referred to as potash. The manufacturing of potash usually involves purification and synthesizing steps. Common potassium fertilizer compounds derived from potash are potassium chloride (KCl) and potassium sulfate (K2SO4).

Other fertilizer compounds can be produced through a chemical reaction between two or more compounds. Most fertilizers manufactured through this process involve a chemical reaction between two compounds that each contain at least one of the three N—P—K essential nutrients so that the product is a single compound composed of at least two of the three N—P—K essential nutrients. Common potassium fertilizer compounds produced using this method are potassium phosphate (K3PO4) and potassium nitrate (KNO3).

Fertilizers are generally manufactured to be in either a solid physical state or a dry fertilizer or a liquid physical state or a liquid fertilizer. Fertilizer compounds selected for use in dry fertilizers, such as the above-mentioned common fertilizer compounds, have chemical properties that make them stable in a dry, solid physical state.

Fertilizer compounds used in liquid fertilizers may be selected from the common dry fertilizer compounds and then dissolved or suspended in water. Additionally, liquid fertilizers have the advantage of being able to utilize compounds that have hygroscopic or deliquescent properties. Such compounds are unstable in a dry, solid state as they readily absorb moisture and may become liquid. One such compound that is currently only used in liquid fertilizers due to its hygroscopic and deliquescent chemical properties is potassium citrate (C6H5K3O7).

Liquid fertilizers have many applications in commercial farming operations, such as use in dual fertilizer-irrigation systems, treatment of crop seed to improve germination rates, and use in hydroponic systems. However, the benefits of liquid fertilizers are lost on urban gardeners who may have a small landscape, vegetable garden, or a few plants. Liquid fertilizer concentrates have application rates that far exceed the fertilizing needs of an urban gardener with a few plants. Furthermore, liquid fertilizer concentrates require measurements, mixing capabilities and tools that an urban gardener may not possess. Pre-mixed, ready-to-use liquid fertilizers exist, but they come in heavy and cumbersome containers composed of primarily water weight which are a challenge to transport and carry.

Thus, there is a need and it would be advantageous to have a dry fertilizer that forms compounds with chemical properties, such as hygroscopic and deliquescent properties in the form of potassium citrate, currently only found in liquid fertilizers.

SUMMARY

In one aspect, there is disclosed a dry fertilizer comprising citric acid and one of potassium carbonate and potassium bicarbonate. The dry fertilizer may include a combination of potassium carbonate and potassium bicarbonate. The dry fertilizer may be one of a tablet, powder, meal and pellets. The thy fertilizer may include one of plant nutrients, soil nutrients, carbonates, bicarbonates, acids, oils, microorganisms, biostimulants, enzymes, hormones, fertilizers, lubricants, and binding agents. The dry fertilizer may be packaged.

In another aspect, a method for forming a potassium citrate mixture is disclosed, comprising providing a thy fertilizer having citric acid and one of potassium carbonate and potassium bicarbonate and mixing the dry fertilizer with a liquid to form the potassium citrate mixture, wherein the liquid comprises one of water and a water-based liquid. The dry fertilizer may include a combination of potassium carbonate and potassium bicarbonate.

The mixing step may further comprise mixing one of the water and a water-based liquid in one of a watering can, spray bottle, sprayer, and an irrigation system. The method may further include applying the potassium citrate mixture using one of a watering can, spray bottle, sprayer, and irrigation system. The method may also include packaging the dry fertilizer.

These and other objects of the present invention will become obvious to one skilled in the art following the detailed descriptions and specific examples below. While the examples and descriptions below generally describe the fertilizer and represent preferred embodiments of the present invention, numerous variations and refinements are possible and such variations are included in the spirit of this invention,

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 1 shows a method for forming a potassium citrate mixture from a dry fertilizer in an embodiment.

DETAILED DESCRIPTION

Each of the additional features and teachings disclosed below can be utilized separately or in conjunction with other features and teachings to provide a dry fertilizer that forms a potassium citrate mixture when exposed to a liquid, such as water or a water-based liquid, and methods of making the same. Representative examples of the present invention, which utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detailed description may not be necessary to practice the invention in the broadest sense and are instead taught merely to particularly describe representative examples of the present teachings.

Moreover, the various features of the representative examples and the dependent claims may be combined in ways that are not specifically and explicitly enumerated to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for original disclosure, as well as for the purpose of restricting the claimed subject matter.

A dry fertilizer that forms a potassium citrate mixture when exposed to a liquid, such as water or a water-based liquid, and methods of making the same are disclosed. Potassium is an essential element critical to plant functions including strong stem growth, movement of water throughout the plant, flowering and fruiting. In the soil, the presence of potassium fertilizer may increase water retention and aeration. Potassium citrate as a fertilizer compound offers several benefits. Potassium citrate contains the potassium element required by plants and soil. Potassium citrate contains no other elements or properties known to be harmful to plants or soil. Further, potassium citrate has relatively neutral PH which means it is suitable for use on plants that require neutral, alkaline or acidic conditions. Potassium citrate has the benefit of being hygroscopic and deliquescent, both of which are chemical properties of fertilizer compounds that are immediately available to plants and soil microorganisms.

In one embodiment, the dry fertilizer may include reactants potassium carbonate or potassium bicarbonate and citric acid. Plant nutrients, soil nutrients, carbonates, bicarbonates, acids, oils, microorganisms, biostimulants, enzymes, hormones, fertilizers, lubricants, binding agents or any combination thereof may also be included in the fertilizer.

The fertilizer may come in any dry form. In one embodiment, the fertilizer may be in the form of a powder, meal, pellet, or tablet. In one embodiment, when the dry fertilizer is exposed to liquid, such as water or a water-based liquid, the dry fertilizer may produce a potassium citrate mixture, which may be applied to plants or soil with a watering can, spray bottle, sprayer, or irrigation system. It should be understood that the term "water-based" means containing an amount of water. In one embodiment, the liquid, such as water or a water-based liquid, to react, mix, or dissolve the dry fertilizer may be approximately two ounces or more.

The dry fertilizer may be packaged in a commercially practical manner. In some embodiments, the fertilizer may be packaged. In one example, the fertilizer in dry powder or meal may be portioned and filled into varying sized resealable bags. Alternatively, the fertilizer in dry powder or meal may be packed into small single-use packets that may be packed as individuals or filled into boxes of various quantities. The fertilizer in dry powder or meal may further be refined into pellets or manufactured into tablets that may be packed individually into single-use packets that may be packed as individuals or in boxes of various quantities. Alternatively, the fertilizer as pellets or tablets may be packed into multi-celled register hanger cards, tubes, or other small display packaging. The fertilizer as pellets or tablets may also be packed into resealable bags of varying sizes. The packaging may be air tight and moisture sealed. The packaging may also include foil lidding with a PVC tray for the dry fertilizer.

A method for forming a potassium citrate ($C_6H_5K_3O_7$) mixture from a dry fertilizer that includes potassium carbonate ($K_2CO_3$) or potassium bicarbonate ($KHCO_3$) and citric acid ($C_6H_8O_7$) that when mixed with a liquid, such as water or a water-based liquid, may include using stoichiometric chemical equations to ensure that all potassium carbonate or potassium bicarbonate and citric acid completely react and to determine the mass of potassium citrate that is produced. The method may also include the addition of materials to the dry fertilizer including other plant nutrients, soil nutrients, carbonates, bicarbonates, acids, oils, microorganisms, biostimulants, enzymes, hormones, fertilizers, lubricants, binding agents or any combination thereof. In one embodiment, the resulting potassium citrate mixture does not contain any leftover reactants from the reaction of potassium carbonate or potassium bicarbonate and citric acid.

In one embodiment, a chemical reaction of dry ingredients including potassium bicarbonate and citric acid when mixed with a liquid, such as water or a water-based liquid may form a potassium citrate mixture, as shown below.

| Dry Fertilizer | Mixed with Liquid | Liquid Mixture |
| --- | --- | --- |
| (1) $C_6H_8O_7$ + (3) $KHCO_3$ | -> | (1) $C_6H_5K_3O_7$ + (3) $CO_2$ + (3)$H_2O$ | citric acid  potassium bicarbonate  potassium citrate  carbon dioxide  water

Mixing water or a water-based liquid with potassium bicarbonate and citric acid produces potassium citrate, carbon dioxide, and water.

In one embodiment, a chemical reaction of dry ingredients including potassium carbonate and citric acid when mixed with a liquid, such as water or a water-based liquid may form a potassium citrate mixture, as shown below.

| Dry Fertilizer | Mixed with Liquid | Liquid Mixture |
| --- | --- | --- |
| (2) $C_6H_8O_7$ + (3) $K_2CO_3$ | -> | (2) $C_6H_5K_3O_7$ + (3) $CO_2$ + (3)$H_2O$ | citric acid  potassium carbonate  potassium citrate  carbon dioxide  water

Mixing water or a water-based liquid with potassium carbonate and citric acid produces potassium citrate, carbon dioxide, and water.

FIG. 1 shows a method 100 for forming dry fertilizer in an embodiment. At step 101, a formulation for the resultant potassium citrate mixture may be calculated. In one embodiment, stoichiometric chemical equations may be used to ensure that all potassium carbonate or potassium bicarbonate and citric acid completely react and to determine the mass of potassium citrate that is produced. In another embodiment, a formulation including potassium carbonate or potassium bicarbonate and citric acid with plant nutrients, soil nutrients, carbonates, bicarbonates, acids, oils, microorganisms, biostimulants, enzymes, hormones, fertilizers, lubricants, or binding agents may be formed to achieve specific N—P—K values, fertilizing requirements, or other benefits. In other embodiments, step 101 may be optional and the formulation may be predetermined.

At step 102 the potassium carbonate or potassium bicarbonate and citric acid are collected or received in a powder, meal or granular form. In one embodiment, granular or other course ingredients may be powderized or reduced into a meal. Any dry or liquid ingredients including but not limited to plant nutrients, soil nutrients, carbonates, bicarbonates, acids, oils, microorganisms, biostimulants, enzymes, hormones, fertilizers, lubricants, or binding agents may also be collected and prepared. The citric acid, potassium carbonate or potassium bicarbonate, and any other ingredients are thoroughly combined to ensure consistency throughout. At step 104, a dry powder or meal may be formed. The powder or meal may be processed into pellets (step 103) or tablets (step 105). The resultant product from steps 103-105 may then be packaged at step 106.

At step 107, liquid, such as water or other water-based liquid, may be mixed with the product formed at step 106 to form the potassium citrate mixture. The liquid at step 107 may be mixed with the product formed in step 106 in a watering can, spray bottle, sprayer, or irrigation system. The reaction, mix or dissolve time for the potassium citrate mixture once a liquid, such as water or a water-based liquid, is added may be approximately five minutes or less. In other embodiments, the reaction, mix, or dissolve time may be approximately one minute. At step 108, the resulting potassium citrate mixture may be applied to either side of the plant leaves, roots, the plant root zone, or the soil or any combination of thereof. The resulting mixture may be applied using a watering can, spray bottle, sprayer, or irrigation system to soil or plant or the like.

It is expressly noted that the steps in FIG. 1 may be performed in any order and certain steps may be omitted. For example, a commercially available dry fertilizer may be formed and packaged at step 106. The resulting mixture at step 107 may occur at the time of application of the mixture to soil or plants at step 108.

In some embodiments, the amount of citric acid in the dry fertilizer may be about 7.8% citric acid by mass to about 48% citric acid by mass. In other embodiments, the amount of potassium bicarbonate in the dry fertilizer may be about 12.2% potassium bicarbonate by mass to about 61% potassium bicarbonate by mass. In other embodiments, the amount of potassium carbonate in the dry fertilizer may be about 10.4% potassium carbonate by mass to about 52% potassium carbonate by mass. In some embodiments, the amount of potassium carbonate and potassium bicarbonate in combination may be about 10.4% by mass to about 61% potassium carbonate and potassium bicarbonate by mass.

Below are several examples of one or more embodiments of the invention for the dry fertilizer showing the combination of at least citric acid with one or more of potassium carbonate or potassium bicarbonate and any other ingredients described herein using the methods herein including that described in FIG. 1. Each of the percentages below are expressed in percentages by mass. In each example, a liquid, such as water or a water-based liquid, may be mixed with the dry fertilizer to form the potassium citrate mixture.

EXAMPLE 1

39% Citric Acid
61% Potassium Bicarbonate

EXAMPLE 2

48% Citric Acid
52% Potassium Carbonate

EXAMPLE 3

27% Citric Acid
43% Potassium Bicarbonate
20% Nitrogen Fertilizer
10% Phosphorus Fertilizer

EXAMPLE 4

34% Citric Acid
36% Potassium Carbonate
10% Nitrogen Fertilizer
10% Phosphorus Fertilizer
5% Potassium Fertilizer
5% Micro-Nutrients

EXAMPLE 5

29% Citric Acid
46% Potassium Bicarbonate
25% 20-20-20 (N—P—K) Fertilizer

EXAMPLE 6

24% Citric Acid
26% Potassium Carbonate
50% 10-10-10 (N—P—K) Fertilizer

EXAMPLE 7

7.8% Citric Acid
12.2% Potassium Bicarbonate
80% plant nutrients, soil nutrients, carbonates, bicarbonates, acids, oils, microorganisms, biostimulants, enzymes, hormones, fertilizers, lubricants, or binding agents

EXAMPLE 9

9.6% Citric Acid
10.4% Potassium Carbonate
80% plant nutrients, soil nutrients, carbonates, bicarbonates, acids, oils, microorganisms, biostimulants, enzymes, hormones, fertilizers, lubricants, or binding agents

EXAMPLE 8

21.8% Citric Acid
15.2% Potassium Bicarbonate
13% Potassium Carbonate
50% plant nutrients, soil nutrients, carbonates, bicarbonates, acids, oils, microorganisms, biostimulants, enzymes, hormones, fertilizers, lubricants, or binding agents The foregoing description of the preferred embodiments of the present invention has been presented for purposes of illustration and description. It is not intended to be exhaustive or to limit the invention to the precise form or to the exemplary embodiments disclosed. Obviously, many modifications and variations will be apparent to practitioners skilled in this art. Similarly, any process steps described might be interchangeable with other steps in order to achieve the same result. The embodiments were chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for"

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A dry fertilizer, comprising:
   citric acid, 50.1% potassium bicarbonate by mass to about 61% potassium bicarbonate by mass, and at least one selected from the group of a microorganism, a biostimulant, an enzyme, a hormone, and combinations thereof.

2. The dry fertilizer of claim 1, further comprising at least one of a tablet, a powder, a meal, a granule, and a pellet.

3. The dry fertilizer of claim 1, further comprising at least one selected from the group of a carbonate, a bicarbonate, an acid, and combinations thereof.

4. The dry fertilizer of claim 1, further comprising about 7.8% citric acid by mass to about 48% citric acid by mass.

5. The dry fertilizer of claim 1, further comprising potassium carbonate.

6. The dry fertilizer of claim 1, further comprising at least one selected from the group of a plant nutrient, a soil nutrient, a fertilizer, a nitrogen fertilizer, a phosphorus fertilizer, a potassium fertilizer, a micro-nutrient, a combination fertilizer, and combinations thereof.

7. The dry fertilizer of claim 1, further comprising at least one selected from the group of an oil, a lubricant, a binding agent, and combinations thereof.

8. The dry fertilizer of claim 1 further comprising a package.

9. The dry fertilizer of claim 8, wherein the package is at least one of air tight and moisture sealed.

10. The dry fertilizer of claim 8, wherein the package comprises at least one of a bag, a resealable bag, a single-use packet, a box, a tube, a display package, a multi-celled package, and a register hanger card.

11. The dry fertilizer of claim 8, wherein the package comprises at least one of foil and PVC.

* * * * *